(12) United States Patent
Kismarton

(10) Patent No.: US 7,721,495 B2
(45) Date of Patent: May 25, 2010

(54) COMPOSITE STRUCTURAL MEMBERS AND METHODS FOR FORMING THE SAME

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 383 days.

(21) Appl. No.: 11/096,743

(22) Filed: Mar. 31, 2005

(65) Prior Publication Data

US 2006/0236652 A1 Oct. 26, 2006

(51) Int. Cl.
*E04C 1/00* (2006.01)

(52) U.S. Cl. ............... 52/309.16; 52/126.1; 52/578; 52/592.6; 248/188.2; 428/298.1; 428/299.1; 428/299.4; 428/105; 428/107

(58) Field of Classification Search ............ 52/126.1, 52/309.16, 578, 592.6; 248/188.2; 428/298.1, 428/299.1, 299.4, 105, 107, 109; 244/123, 244/119, 133; 442/218, 268, 269, 271, 277, 442/278

See application file for complete search history.

(56) References Cited

U.S. PATENT DOCUMENTS

| | | | |
|---|---|---|---|
| 2,108,041 A | 2/1938 | Colvin, Jr. | |
| 2,498,976 A | 2/1950 | Wittman | |
| 2,534,722 A | 12/1950 | Meiklejohn, Jr. et al. | |
| 2,611,564 A | 9/1952 | Geisse | |
| 3,238,690 A | 3/1966 | Wilkins | |
| 3,266,130 A | 8/1966 | Glaze | |
| 3,381,484 A * | 5/1968 | Laughlin | 405/215 |
| 3,490,983 A | 1/1970 | Lee | |
| 3,768,760 A * | 10/1973 | Jensen | 244/123.6 |
| 3,975,916 A * | 8/1976 | Watson | 405/212 |
| 3,976,269 A | 8/1976 | Gupta | |
| 3,983,900 A | 10/1976 | Airhart | |
| 4,084,029 A | 4/1978 | Johnson et al. | |
| 4,098,559 A | 7/1978 | Price | |
| 4,177,306 A | 12/1979 | Schulz et al. | |
| 4,198,018 A | 4/1980 | Brault | |
| 4,207,778 A | 6/1980 | Hatch | |
| 4,232,844 A | 11/1980 | Sobey | |

(Continued)

FOREIGN PATENT DOCUMENTS

DE 202004007601 U1 12/2004

(Continued)

OTHER PUBLICATIONS

Garfinkle et al., "Aerospace: Smart Spars, Intrinsically-Smart Composite Structures", Fiber Architects, High Performance Textile Consultants, http://fiberarchitects.com/aerospace/spar.html, pp. 1-8, Jan. 1999.

(Continued)

*Primary Examiner*—Richard E Chilcot, Jr.
*Assistant Examiner*—Mark R Wendell

(57) ABSTRACT

Composite structural members and methods for forming the same are disclosed. In one disclosed embodiment, a composite structural member includes a central structural portion comprised of a reinforced, polymer-based material and having a length, a first side and an opposing second side extending along the length. A first reinforcement member fixedly coupled to the first side and a second reinforcement member fixedly coupled to the second side.

14 Claims, 7 Drawing Sheets

U.S. PATENT DOCUMENTS

| | | | |
|---|---|---|---|
| 4,310,132 A | 1/1982 | Frosch et al. | |
| 4,368,234 A | 1/1983 | Palmer et al. | |
| 4,379,798 A | 4/1983 | Palmer et al. | |
| 4,413,110 A | 11/1983 | Kavesh et al. | |
| 4,425,980 A | 1/1984 | Miles | |
| 4,627,791 A | 12/1986 | Marshall | |
| 4,712,533 A | 12/1987 | Cruise | |
| 4,734,146 A | 3/1988 | Halcomb et al. | |
| 4,741,943 A | 5/1988 | Hunt | |
| 4,808,461 A | 2/1989 | Boyce et al. | |
| 4,908,254 A | 3/1990 | Fischer et al. | |
| 4,966,802 A | 10/1990 | Hertzberg | |
| 5,096,772 A * | 3/1992 | Snyder | 428/105 |
| 5,154,370 A | 10/1992 | Cox et al. | |
| 5,164,255 A | 11/1992 | Weeks | |
| 5,242,523 A | 9/1993 | Willden et al. | |
| 5,251,848 A | 10/1993 | Gannatal | |
| 5,269,657 A | 12/1993 | Garfinkle | |
| 5,306,557 A | 4/1994 | Madison | |
| 5,333,568 A | 8/1994 | Meldner et al. | |
| 5,342,465 A | 8/1994 | Bronowicki et al. | |
| 5,362,345 A | 11/1994 | Stettler et al. | |
| 5,429,066 A | 7/1995 | Lewit et al. | |
| 5,429,326 A * | 7/1995 | Garesche et al. | 244/133 |
| 5,518,208 A | 5/1996 | Roseburg | |
| 5,538,781 A | 7/1996 | Rao et al. | |
| 5,632,940 A | 5/1997 | Whatley | |
| 5,669,999 A | 9/1997 | Anderegg et al. | |
| 5,735,486 A | 4/1998 | Piening et al. | |
| 5,766,724 A | 6/1998 | Tailor et al. | |
| 5,833,786 A | 11/1998 | McCarville et al. | |
| 5,866,272 A | 2/1999 | Westre et al. | |
| 5,922,446 A | 7/1999 | Piening et al. | |
| 5,958,550 A * | 9/1999 | Childress | 428/119 |
| 5,972,524 A * | 10/1999 | Childress | 428/615 |
| 6,024,325 A | 2/2000 | Carter, Jr. | |
| 6,037,060 A | 3/2000 | Blohowiak et al. | |
| 6,114,050 A * | 9/2000 | Westre et al. | 428/608 |
| H1872 H | 10/2000 | Bowman | |
| 6,277,463 B1 * | 8/2001 | Hamilton et al. | 428/106 |
| 6,306,239 B1 | 10/2001 | Breuer et al. | |
| 6,320,118 B1 | 11/2001 | Pridham et al. | |
| 6,355,337 B1 | 3/2002 | Piening et al. | |
| 6,355,584 B1 | 3/2002 | Corrons | |
| 6,372,072 B1 | 4/2002 | Healey | |
| 6,405,978 B1 | 6/2002 | Dean et al. | |
| 6,436,507 B1 * | 8/2002 | Pannell | 428/102 |
| 6,502,788 B2 | 1/2003 | Noda et al. | |
| 6,511,570 B2 | 1/2003 | Matsui | |
| 6,565,944 B1 * | 5/2003 | Hartness et al. | 428/109 |
| 6,641,693 B2 | 11/2003 | Guckert et al. | |
| 6,641,893 B1 * | 11/2003 | Suresh et al. | 428/105 |
| 6,655,633 B1 | 12/2003 | Chapman, Jr. | |
| 6,703,118 B2 | 3/2004 | van Weperen et al. | |
| 6,779,830 B2 * | 8/2004 | Patberg et al. | 296/146.6 |
| 6,835,341 B2 | 12/2004 | Noda et al. | |
| 6,886,780 B1 | 5/2005 | Frontera Castaner | |
| 6,914,021 B2 | 7/2005 | Sidwell | |
| 7,080,805 B2 | 7/2006 | Prichard et al. | |
| 7,115,323 B2 | 10/2006 | Westre et al. | |
| 7,159,822 B2 | 1/2007 | Grantham et al. | |
| 2002/0015819 A1 | 2/2002 | Edwards et al. | |
| 2003/0148082 A1 | 8/2003 | Bompard et al. | |
| 2003/0168555 A1 | 9/2003 | Livi et al. | |
| 2003/0189131 A1 | 10/2003 | Cloud et al. | |
| 2004/0024502 A1 | 2/2004 | Squires et al. | |
| 2004/0213952 A1 * | 10/2004 | Takemura et al. | 428/105 |
| 2004/0265536 A1 | 12/2004 | Sana et al. | |
| 2005/0153098 A1 | 7/2005 | Bhatnagar et al. | |
| 2005/0250440 A1 | 11/2005 | Zhou et al. | |
| 2005/0263645 A1 | 12/2005 | Johnson et al. | |
| 2006/0226287 A1 | 10/2006 | Grantham et al. | |
| 2006/0237588 A1 | 10/2006 | Kismarton | |

FOREIGN PATENT DOCUMENTS

| | | |
|---|---|---|
| EP | 0433686 A1 | 6/1991 |
| EP | 1174533 A1 | 1/2002 |
| EP | 1336469 A1 | 8/2003 |
| EP | 1762666 A1 | 3/2007 |
| FR | 2660892 | 10/1991 |
| GB | 2238977 A | 6/1991 |
| JP | 2003066968 | 3/2003 |
| WO | WO9640551 | 12/1996 |
| WO | WO0216197 A1 | 2/2002 |
| WO | WO0216784 A1 | 2/2002 |

OTHER PUBLICATIONS

Gay, "Materiaux Composites," Hermes, Paris, 4th edition, 1997, pp. 107-109.

* cited by examiner

[62, 66, 67, 62, 66] ; [62, 66, 68, 62, 66] ...
[66, 62, 68, 66, 62] ; [66, 62, 67, 66, 62] ...

COMPOSITE STRUCTURAL MEMBERS AND METHODS FOR FORMING THE SAME

CROSS REFERENCE TO RELATED APPLICATIONS

This patent application is related to the following co-pending, commonly-owned U.S. patent applications, which applications are hereby incorporated by reference: U.S. patent application Ser. No. 11/541,620 entitled "Composite Structural Member Having an Undulating Web and Method for Forming the Same"; U.S. patent application Ser. No. 11/096,796 entitled "Hybrid Fiberglass Composite Structures and Methods for Forming the Same"; U.S. patent application Ser. No. 11/096,727 entitled "Multi-Axial Laminate Composite Structures and Methods of Forming the Same".

FIELD OF THE INVENTION

This invention relates generally to structural components, and more particularly, to composite structural members.

BACKGROUND OF THE INVENTION

Structural members are available in a wide variety of configurations to provide structural support under a variety of loading conditions. For example, a fuselage portion of an aircraft typically includes parallel and longitudinally oriented structural members called keel beams that impart flexural stiffness to the fuselage, particularly in a region where the wing assemblies of the aircraft are joined to the fuselage. Typically, a structural member, such as an aircraft keel beam, is fabricated from aluminum or titanium, and is configured to resist high flexural loads. Accordingly, the structural member may contribute substantially to the overall weight of the aircraft structure.

Reinforced polymer-based materials are also available, and may be used to form various structural members. Such materials may be used as a substitute for metals particularly in applications where relatively low weight and high mechanical strength is desired. As a result, reinforced polymer-based materials are widely used in a variety of commercial and military aircraft, terrestrial vehicles and consumer products. The material is generally comprised of a network of reinforcing fibers that are generally applied in layers, and a polymeric resin that substantially wets the reinforcing fibers to form an intimate contact between the resin and the reinforcing fibers. The material may then be formed into a structural component by a variety of known forming methods, such as an extrusion process or other forming processes.

Structural members formed from reinforced polymer-based materials are generally more expensive to fabricate, and more difficult to inspect and repair than corresponding structural members formed from metals. In particular, repair methods for metallic structural members that have sustained in-service damage due to excessive loading, or have sustained fatigue and/or corrosive damage while in service, are well developed.

What is required is a structural member that is easily and inexpensively fabricated, provides a favorable flexural strength to weight ratio in comparison to conventional structural members, and may be easily assembled, inspected and repaired.

SUMMARY

Composite structural members and methods for forming the same are disclosed. In one aspect, a composite structural member includes a central structural portion comprised of a reinforced, polymer-based material and having a length, a first side and an opposing second side extending along the length. A first reinforcement member is fixedly coupled to the first side and a second reinforcement member is fixedly coupled to the second side.

BRIEF DESCRIPTION OF THE DRAWINGS

Various embodiments of the present invention are described in detail below with reference to the following drawings.

DETAILED DESCRIPTION

The present invention relates to composite structural members and methods for making the same. Many specific details of certain embodiments of the invention are set forth in the following description and in FIGS. 1 through 9 to provide a thorough understanding of such embodiments. One skilled in the art, however, will understand that the present invention may have additional embodiments, or that the present invention may be practiced without several of the details described in the following description. In the present discussion, it is understood that a composite structural member refers to a member comprised of dissimilar materials, and that the term "reinforced polymer-based material" includes various non-homogeneous polymer-based materials, commonly referred to as "reinforced composites", "carbon-fiber composites", or still other terms known in the art.

Figure 1:
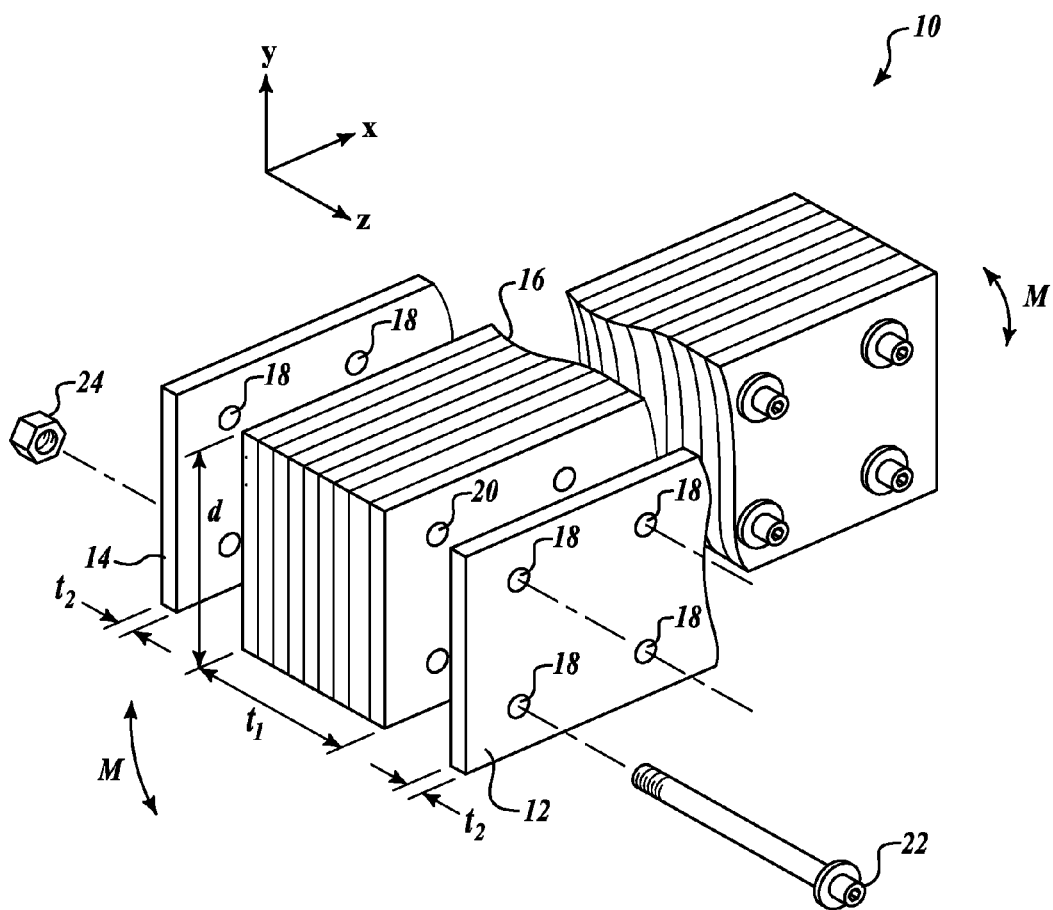
FIG. 1 is a partial exploded, isometric view of a composite structural member according to an embodiment of the invention.

FIG. 1 is a partial exploded, isometric view of a composite structural member 10 according to an embodiment of the invention. The composite structural member 10 includes a first reinforcement member 12 and a second reinforcement member 14 that generally extend in an x-direction to a desired length. The first reinforcement member 12 and the second reinforcement member 14 are positioned on opposing sides of a central structural member 16, which also extends in the x-direction to a comparable length. The first reinforcement member 12 and the second reinforcement member 14 may be comprised of any suitable material, including a ferrous or a non-ferrous metal, but in a particular embodiment, the first reinforcement member 12 and the second reinforcement member 14 are fabricated from a titanium-based alloy.

The central structural member 16 is comprised of a reinforced polymer-based material having a predetermined depth 'd' and thickness '$t_1$' that is suitably dimensioned to resist an anticipated bending moment M, having an axis of orientation approximately directed in a z-direction. The reinforced polymer-based material includes a plurality of reinforcing fibers that are distributed within the material in discrete plies that are positioned in a predetermined orientation. Ply orientation patterns for the reinforcing fibers will be discussed in greater detail below. The reinforcing fibers may include, for example, glass fibers, aramid fibers, boron fibers, alumina fibers and silicon carbide fibers. In one particular embodiment, however, the reinforced polymer-based material includes a plurality of carbon fibers that are embedded in a high performance epoxy compound to impart a high structural stiffness to the structural member 10. In other embodiments, the discrete plies of the central structural member 16 may be stitched together. Alternately, staples may be used to couple the discrete plies together.

Still referring to FIG. 1, the first reinforcement member 12 and the second reinforcement member 14 include a plurality of apertures 18 that project through the members 12 and 14 and correspond to a plurality of apertures 20 that project through the central structural member 16. The apertures 18 and 20 are suitably sized to accommodate a plurality of fasteners 22 that threadably engage a plurality of nut portions 24 that cooperatively couple the first reinforcement member 12 and the second reinforcement member 14 to the central structural member 16. The fasteners 22 and the nut portions 24 further cooperatively impart a predetermined compressive force in a z-direction to the central structural member 16 when a predetermined torque is imparted to the fastener 22. In one particular embodiment, the fasteners 22 and the corresponding nut portions 24 may be selected from the well-known National Aerospace Standard (NAS) series of structural bolts and corresponding nut portions, although other alternative fasteners exist. For example, the HI-SHEAR, HI-LOK or HI-LOK/HI-TIGUE fastening systems available from the Hi-Shear Corporation of Torrance, Calif. may also be used to couple the first reinforcement member 12 and the second reinforcement member 14 to the central structural member 16. The foregoing fastening systems develop a predetermined tension by including a shear portion that breaks during installation when the predetermined tension is achieved. Consequently, a torque inspection following installation is unnecessary. The first reinforcement member 12 and the second reinforcement member 14 are further suitably sized to have thicknesses $t_2$ so that the predetermined compressive force is relatively uniformly distributed to the central structural member 16. In other embodiments, the fasteners 22 may include a deformable tension members, such as rivets, or other similar devices.

Figure 2:
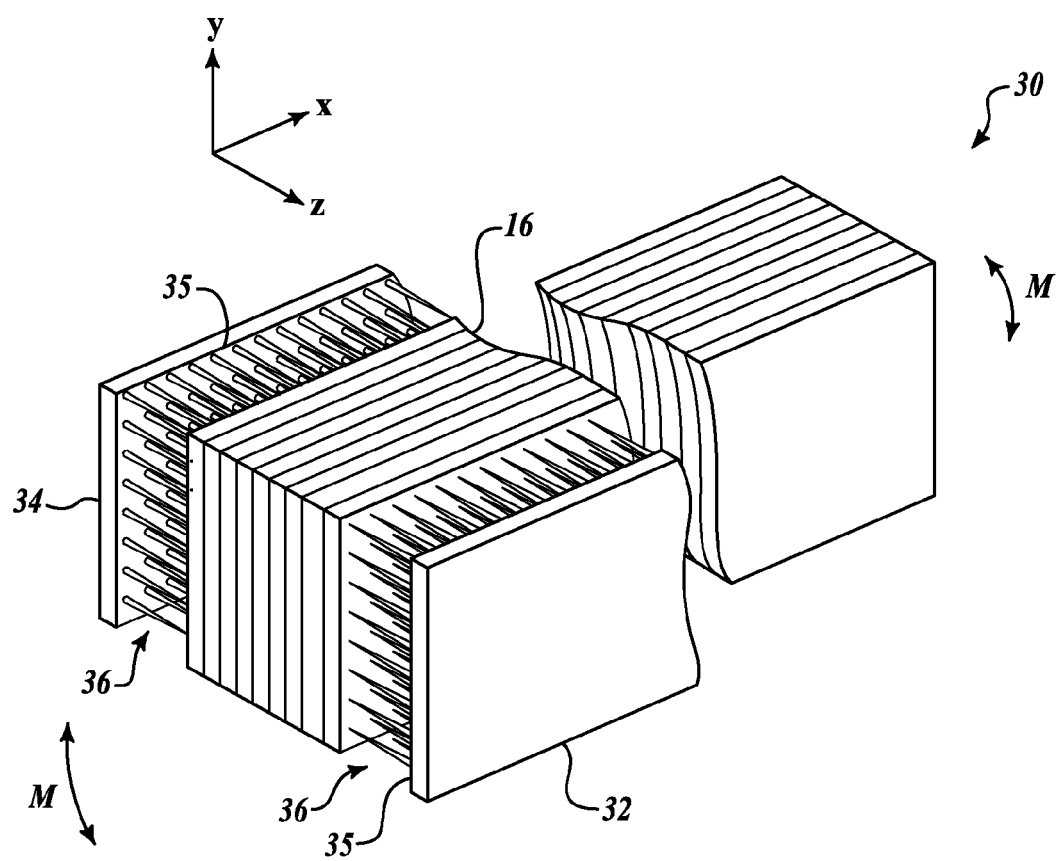
FIG. 2 is a partial exploded, isometric view of a composite structural member according to another embodiment of the invention.

FIG. 2 is a partial exploded, isometric view of a composite structural member 30 according to another embodiment of the invention. The composite structural member 30 includes a first reinforcement member 32 and a second reinforcement member 34 that further include a plurality of z-pin members 36 extending outwardly from respective contacting surfaces 35 of the first reinforcement member 32 and the second reinforcement member 34. In one particular embodiment, the z-pin members 36 are embedded into the central structural member 16 by exciting the z-pin members 36 with ultrasound energy as the members 34 are impressed into the central structural member 16, as described in detail in U.S. Pat. No. 4,808,461 to Boyce, et al. and entitled "Composite Structure Reinforcement", which patent is included herein by reference. Although the first reinforcement member 32 and the second reinforcement member 34 are coupled to the central structural member 16 using the z-pin members 36, it is understood that the composite structural member 30 may also include fasteners (not shown in FIG. 2) that project through the first reinforcement member 32, the second reinforcement member 34 and the central structural member 16 to provide additional reinforcement at selected portions of the member 30 and/or to permit the member 30 to be coupled to other external structures, as will be described in greater detail below.

In the following discussion, various alternate embodiments of the invention will be described. Some of the components and structural aspects of these various embodiments have been described above. Therefore, in the interest of brevity, the description of such components and structural aspects will not be repeated.

Figure 3:
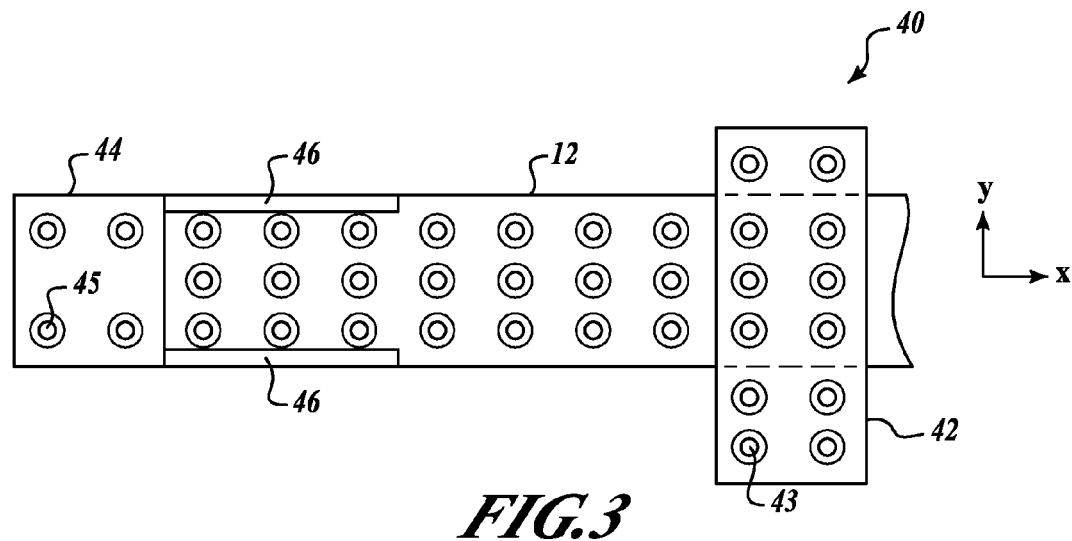
FIG. 3 is a partial elevation view of a composite structural member according to still another embodiment of the invention.
Figure 4:
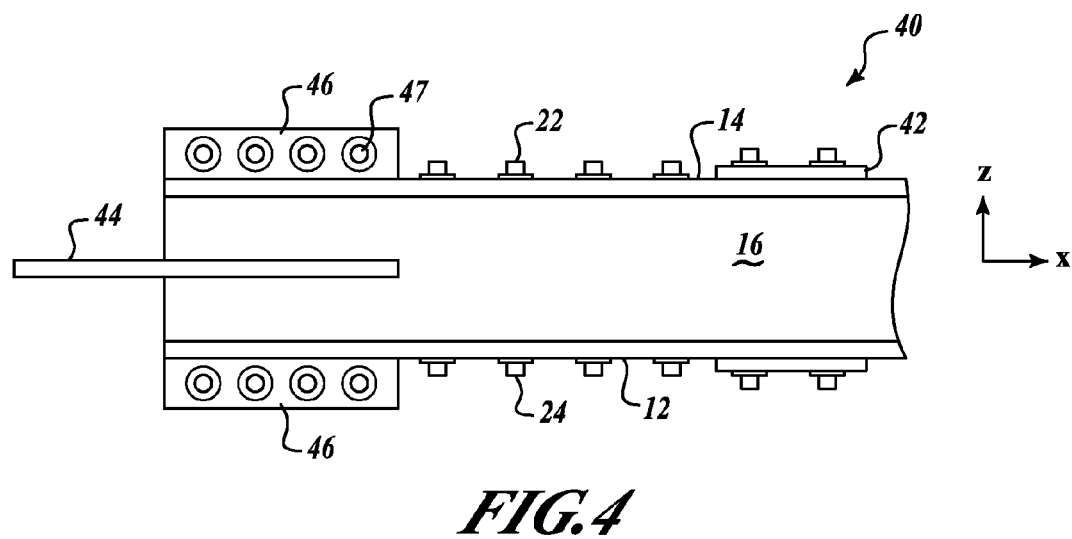
FIG. 4 is a partial plan view of the composite structural member of FIG. 3.

FIG. 3 and FIG. 4 are partial elevation and plan views, respectively, of a composite structural member 40 according to still yet another embodiment of the invention. The composite structural member 40 includes a transverse attachment member 42 that is positioned between the second reinforcement member 14 (or alternately, the first reinforcement member 12) and the central structural member 16 by forming a receiving lateral cutout portion in the central structural member 16. The transverse attachment member 42 is coupled to the composite structural member 40 by fasteners 22 that project through the member 42 and also through the first reinforcement member 12, the second reinforcement member 14 and the central structural member 16. Alternately the transverse attachment member 42 may be coupled to an exterior surface of the second reinforcement member 14 (or alternately, the first reinforcement member 12) so that a receiving cutout portion in the central structural portion 16 is not required. The transverse attachment member 42 may also include apertures 43 that may be used to couple the composite structural member 40 to other external structural portions.

The composite structural member 40 also includes a longitudinal attachment member 44 that is positioned within a longitudinal cutout portion that extends inwardly from an end portion of the member 40 to receive the longitudinal attachment member 44. The member 44 is similarly coupled to the composite structural member 40 by the fasteners 22, which project through the member 44 and also through the first reinforcement member 12, the second reinforcement member 14 and the central structural member 16. The longitudinal attachment member 44 may also include apertures 45 that may also be used to couple the composite structural member 40 to other external structural portions.

With reference still to FIG. 3 and FIG. 4, the composite structural member 40 may also include an angled attachment member 46 that is positioned between the first reinforcement member 12 (or alternately, the second reinforcement member 14) and the central structural member 16 by forming a receiving lateral cutout portion in the central structural member 16. The angled attachment member 46 is coupled to the composite structural member 40 by fasteners 22 that project through the member 46 and also through the first reinforcement member 12, the second reinforcement member 14 and the central structural member 16. Alternately the angled attachment member 46 may be coupled to an exterior surface of the second reinforcement member 14 (or alternately, the first reinforcement member 12) so that a receiving cutout portion in the central structural portion 16 is not necessary. The angled attachment member 46 may also include apertures 47 that may be used to couple the composite structural member 40 to other external structural portions.

Figure 5:
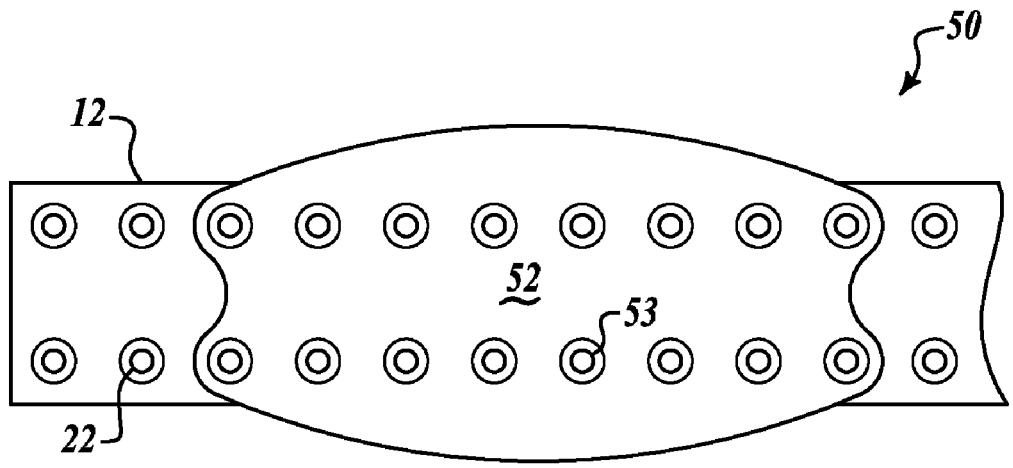
FIG. 5 is a partial elevation view of a composite structural member according to still yet another embodiment of the invention.
Figure 6:
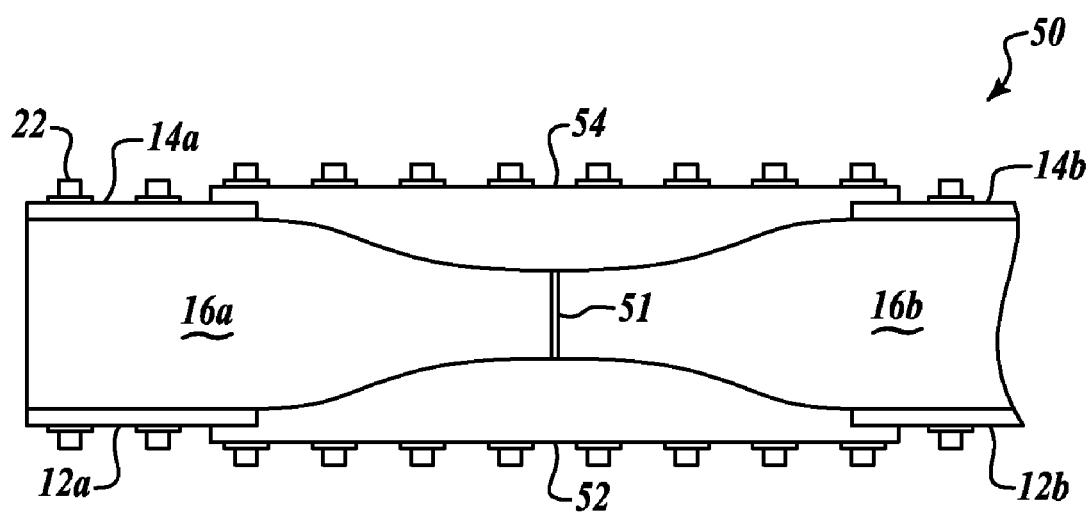
FIG. 6 is a partial plan view of the composite structural member of FIG. 5.

FIG. 5 and FIG. 6 are partial elevation and plan views, respectively, of a composite structural member 50 according to still yet another embodiment of the invention. The composite structural member 50 includes a first central structural portion 16a and a second central structural portion 16b that adjoin at an interface between the first portion 16a and the second portion 16b. The first and second central structural portions 16a and 16b are comprised of a reinforced polymer-based material that includes a plurality of reinforcing fibers that are distributed within the material in discrete plies that are positioned in a predetermined orientation. The first central structural portion 16a is positioned between a first reinforcement member 12a and a second reinforcement member 14a, while the second central structural portion 16b is positioned between a first reinforcement member 12b and a second reinforcement member 14b. A first splicing member 52 includes a plurality of apertures 53 that project through the member 52, and is positioned on the first reinforcement members 12a and 12b so that the apertures 53 are in alignment with apertures that project through the central structural portions 16a and 16b, and also through the members 12a and 12b. A second splicing member 54 is correspondingly positioned on the second reinforcement members 14a and 14b, and also includes a plurality of apertures 53 so that the apertures 53 are also in alignment with apertures that project through the central structural portions 16a and 16b, and through the members 12a and 12b. Accordingly, the fasteners 22 may be extended through the first splicing member 52 and the second splicing member 54, and receive the nut portions 24, so that the member 50 is fixedly coupled. A taper block 51 may be positioned at the interface between the first portion 16a and the second portion 16b in order to provide integrity to the interface.

Figures 7A, 7B:
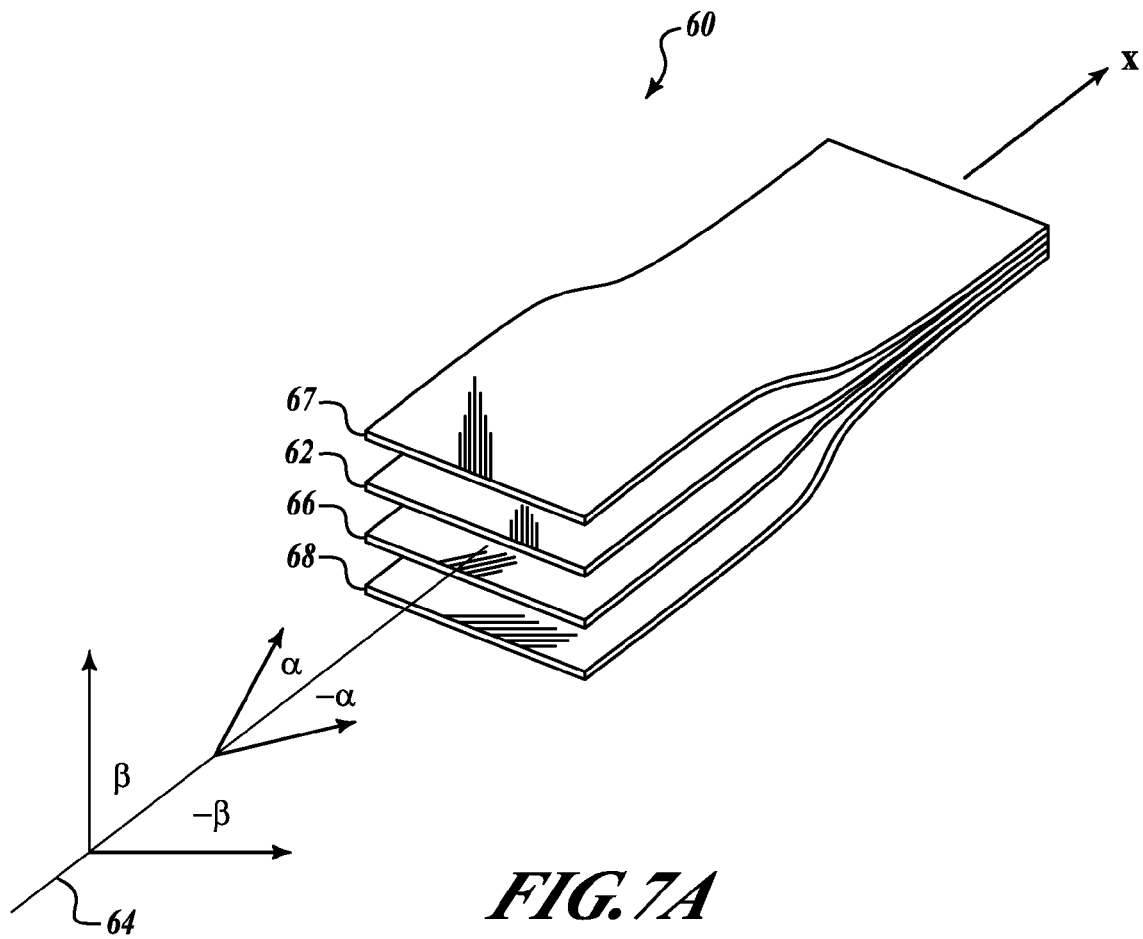
FIG. 7A is a partial isometric view of a ply arrangement for a reinforced polymer material, according to another embodiment of the invention.
FIG. 7B is a ply arrangement for a reinforced polymer material, according to another embodiment of the invention.

FIG. 7A is a partial isometric view of a ply arrangement 60 for a fiber-reinforced resin material according to another embodiment of the invention. The ply arrangement 60 may be used in the central structural member 16 described in the above embodiments. The ply arrangement 60 includes a first layer of reinforcing fibers 62 that are oriented at an angle α with respect to a predetermined orientation direction 64, and a second layer of reinforcing fibers 66 that are oriented at an angle −α with respect to the orientation direction 64. The first layer of reinforcing fibers 62 and the second layer of reinforcing fibers 66 may be repetitively applied in adjacent layers, or they may be spaced apart in non-adjacent layers. In one particular embodiment, the angle α is approximately five degrees.

The ply arrangement 60 further includes a third layer of reinforcing fibers 67 that are oriented at an angle β with respect to a predetermined orientation direction 64, and a fourth layer of reinforcing fibers 68 that are oriented at an angle −β with respect to the orientation direction 64. Although FIG. 7A shows the third layer of reinforcing fibers 67 and the fourth layer of reinforcing fibers 68 spaced apart by the intervening first layer of reinforcing fibers 62 and the second layer of reinforcing fibers 66, it is understood that the third layer of reinforcing fibers 67 and the fourth layer of reinforcing fibers 68 may also be adjacent. In one particular embodiment, the angle β is approximately sixty-five degrees. The ply arrangement 60 may be repetitively assembled to form the central structural member 16 having a thickness $t_1$ (FIG. 1), and may include the first and second layers 62 and 66, and the third and fourth layers 67 and 68 in any predetermined ratio, but in still another particular embodiment, the ratio is approximately 80% first and second layers of reinforcing fibers 62 and 66, with the balance being the third and fourth layers of reinforcing fibers 67 and 68.

FIG. 7B is a ply arrangement 100 according to another embodiment of the invention includes a first ply group 102, a second ply group 104, a third ply group 106, and a fourth ply group 104. The numbers within each of the ply groups 102, 104, 106 and 108 correspond to the plies shown in FIG. 7A. For example, the first ply group 102 includes the first layer of reinforcing fibers 62 and the second layer of reinforcing fibers 66, the third layer of reinforcing fibers 67, and is followed by another first layer of reinforcing fibers 62 and second layer of reinforcing fibers 66. The first group 102, the second group 104, the third group 106 and the fourth group 108 may be applied in any desired combination and may be repeated to any desired degree. In one particular embodiment, a structure includes at least about 60% of the first layer of reinforcing fibers 52 and the second layer of reinforcing fibers 56.

Figure 8:
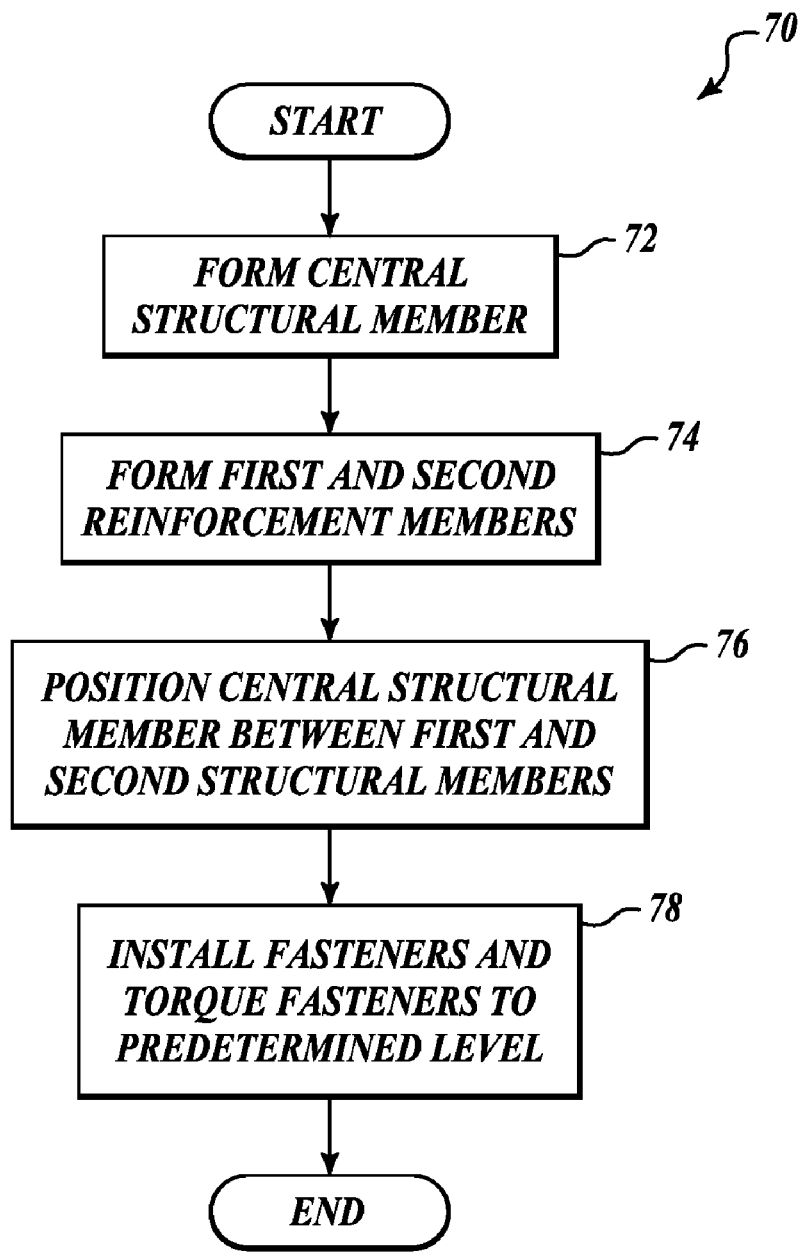
FIG. 8 is a flowchart that describes a method of manufacturing a composite structural member according to another embodiment of the invention.

FIG. 8 is a flowchart that will be used to describe a method 70 of manufacturing a composite structural member according to another embodiment of the invention. The central structural member 16 (FIG. 1) is formed at block 72. The central structural member 16 may be formed from any polymer-based reinforced material, but in a particular embodiment, the central structural member 16 is a carbon fiber reinforced resin based material having at least one of the T700SC, T800SC, M40 and M40J high modulus carbon fibers available from Toray Carbon Fibers of America, Incorporated, of Decatur, Ala., although other suitable reinforcing fibers are available. In still another particular embodiment, the resin is a high strength epoxy resin, such as BMS8-276, also available from Toray Carbon Fibers of America, Incorporated although other suitable resins are available. Apertures 20 may also be formed in the central structural member 16 by drilling, or by other known methods at block 72.

At block 74, the first reinforcement member 12 and the second reinforcement member 14 (FIG. 1) are formed. As discussed above, the members 12 and 14 may be formed from a ferrous or a non-ferrous material, but in a particular embodiment, the members 12 and 14 are formed from a titanium alloy. At block 74, the members 12 and 14 are also provided with apertures 18 (FIG. 1) that project through the members 12 and 14 at locations that correspond to the apertures 20 in the central structural member 16.

At block 76, the central structural member 16 is positioned between the members 12 and 14 so that the apertures 18 in the first and second members 12 and 14 align with the apertures 20 in the central structural member 16. At block 78, fasteners 22 (FIG. 1) are inserted into the apertures 18 and 20, and the fasteners 22 are tensioned to a predetermined torque value, so that a desired compressive force on the central structural member 16 is generated.

Figure 9:
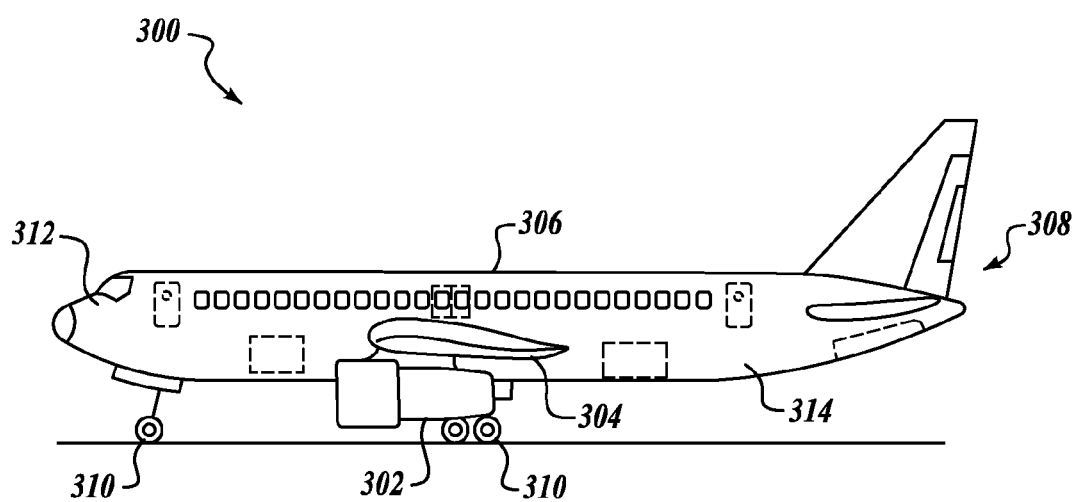
FIG. 9 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 9, a side elevation view of an aircraft 300 having one or more of the disclosed embodiments of the present invention is shown. The aircraft 300 generally includes a variety of components and subsystems generally known in the pertinent art, and which, in the interest of brevity, will not be described in detail. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306, and a flight control system 312 (not shown in FIG. 9), as well as a plurality of other electrical, mechanical and electromechanical systems that cooperatively perform a variety of tasks necessary for the operation of the aircraft 300.

With reference still to FIG. 9, the aircraft 300 may include one or more of the embodiments of the composite structural member 314 according to the disclosed embodiments of the present invention, which may operate in association with the various systems and sub-systems of the aircraft 300. Although the foregoing embodiments of the invention relate specifically to aircraft structural members, it is understood that composite structural members are nevertheless present in other types of vehicles, including various forms of terrestrial vehicles such as ground and marine vehicles, which may utilize the various embodiments of the present invention without significant modification.

Although the aircraft 300 shown in FIG. 9 is generally representative of a commercial passenger aircraft, which may include, for example, the 737, 747, 757, 767 and 777 commercial passenger aircraft available from The Boeing Company of Chicago, Ill., in alternate embodiments, the present invention may also be incorporated into flight vehicles of other types. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

While particular embodiments of the invention have been illustrated and described, as noted above, many changes can be made without departing from the spirit and scope of the invention. Accordingly, the scope of the invention is not limited by the disclosure of these particular embodiments. Instead, the invention should be determined entirely by reference to the claims that follow.

What is claimed is:

1. An article comprising a composite beam sandwiched between first and second reinforcement plates, the beam including a first ply of reinforcing fibers with a fiber orientation of +5 degrees and a second ply of reinforcing fibers with a fiber orientation of −5 degrees.

2. The article of claim 1, wherein at least one of the first and second reinforcement plates includes a plurality of z-pin members that are configured to extend into a respective first side and second side of the beam.

3. The article of claim 1, wherein the plies extend in an x-y plane, wherein holes are drilled through the beam in a z-direction; and wherein fasteners extend through the holes to clamp the plates to the beam.

4. The article of claim 3, wherein the fasteners include fasteners configured to impart a predetermined tension by including a shear portion that breaks during installation when the predetermined tension is achieved.

5. The article of claim 1 further comprising a transverse attachment member positioned between the beam and at least one of the first and second reinforcement plates, wherein the transverse attachment member includes apertures to couple the beam to an external structural portion.

6. The article of claim 1, further comprising a longitudinal attachment member configured to extend outwardly from an end of the beam.

7. The article of claim 1, further comprising an angled attachment member coupled to one of the first and second reinforcement plates and extending outwardly from an end of the beam.

8. The article of claim 1, wherein the beam includes a first portion and a second portion that abut at respective end portions to define an interface, further comprising a first splicing member positioned on the first reinforcement plate, and a second splicing member positioned on the second reinforcement plate, the first splicing member and the second splicing member configured to fixedly couple the first portion and the second portion.

9. The article of claim 1, wherein the article is an aircraft keel beam.

10. The article of claim 1, wherein the beam further includes third and fourth plies of reinforcing fibers with fiber orientations of +65 degrees and −65 degrees, respectively.

11. The article of claim 10, wherein 80% of all fibers in the beam are in the first and second plies.

12. The article of claim 1, wherein the composite beam includes high modulus carbon fibers in a resin.

13. The article of claim 1, wherein the plates are metal plates.

14. An aerospace vehicle, comprising:
a fuselage;
wing assemblies and an empennage operatively coupled to the fuselage; and
an article of claim 1 positioned in at least one of the wing assemblies, the fuselage and the empennage.

* * * * *